Oct. 11, 1949.  C. F. KAPP  2,484,714
TIRE CHAIN CLIP
Filed Oct. 20, 1947
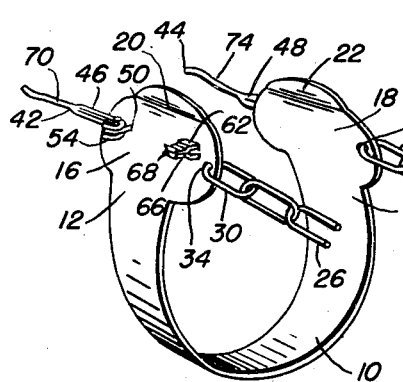
Fig. 1.
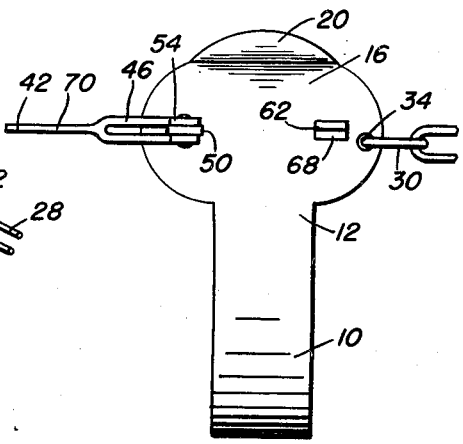
Fig. 2.
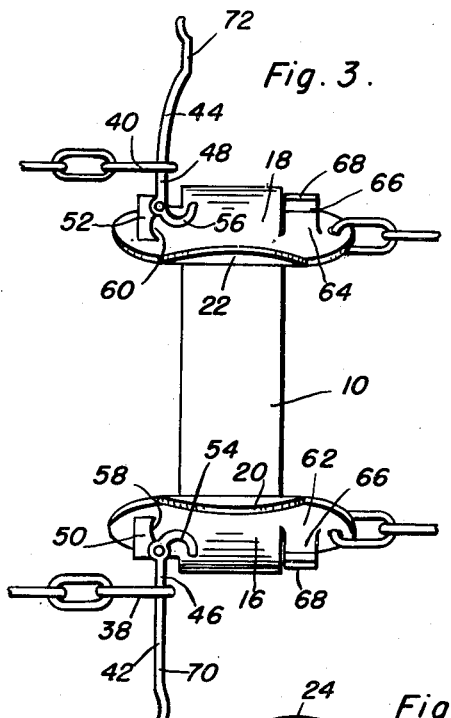
Fig. 3.
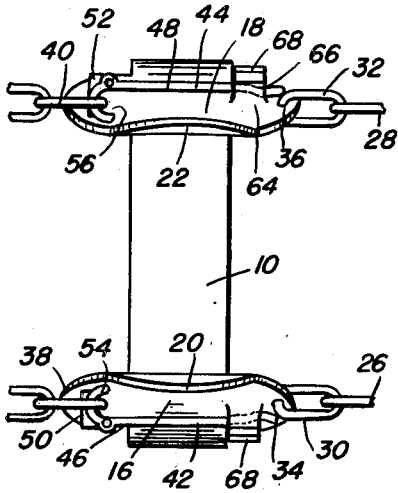
Fig. 4.
Fig. 5.
*Inventor*
Charles F. Kapp
By *Clarence A. O'Brien and Harvey B. Jacobson*
*Attorneys*

Patented Oct. 11, 1949

2,484,714

UNITED STATES PATENT OFFICE 2,484,714

TIRE CHAIN CLIP

Charles F. Kapp, Verona, Pa.

Application October 20, 1947, Serial No. 780,951

3 Claims. (Cl. 152—213)

This invention relates to new and useful improvements in tire chains and the primary object of the present invention is to provide a device for quickly and readily applying and supporting tire chains relative to a vehicle wheel.

Another important object of the present invention is to provide a tire engaging clip engageable with one of the ends of a pair of circumferential tire chains and including novel and improved means for lockably engaging selected links in the free ends of the chains.

A further object of the present invention is to provide a tire chain clip that is so designed as to facilitate the same to be applicable for all sizes of vehicle tires in a precise and convenient manner to the user.

A further aim of the present invention is to provide a tire chain clip that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the tire chain clip constructed in accordance with the present invention, the latch bar in an open position, and with parts of the circumferential chains being broken away and shown in section;

Figure 2 is an elevational view of Figure 1;

Figure 3 is a plan view of Figure 2, and showing the free ends of the circumferential chains engaged with the latch bars in an open position;

Figure 4 is a similar view of Figure 3, and showing the latch bars in a locked position; and Figure 5 is an elevational view of a vehicle tire showing the manner in which the chains are applied thereto from a container with the use of the present clip.

Referring now to the drawings in detail, wherein for the purpose of illustration, there is disclosed a preferred embodiment of the present invention, the numeral 10 represents an arcuate, resilient, substantially U-shaped member the end portions 12 and 14 of which terminate in enlarged bearing portions or plates 16 and 18. It is preferred, that the outer ends of the bearing portions 16 and 18 be provided with outwardly flared tips or projections 20 and 22 that facilitate the application of the member 10 transversely across the periphery of a tire 24.

The numerals 26 and 28 represent a pair of circumferential chains that are disposed on opposite sides of the tire 24. The end links 30 and 32 of these chains are fixedly secured in apertures 34 and 36 provided in one end of each of the bearing portions 16 and 18, and a selected link adjacent the free ends 38 and 40 of the chains 26 and 28 are adapted to engage latch bars 42 and 44 having bifurcated end portions 46 and 48 that are pivoted on opposite sides of fulcrums 50 and 52 rigidly carried by the bearing portions 16 and 18 on opposite ends thereof from the apertures 34 and 36. The outer extremities of the bifurcated end portions 46 and 48 terminate in hooks 54 and 56 that conform to the notched edges 58 and 60 of the fulcrums 50 and 52 and against which the links bear when the latches are in a frictionally locked position between the spaced pairs of resilient ears 62 and 64 carried by the bearing portions 16 and 18. The outer ends 66 of these pairs of ears 62 and 64 terminate in frictionally clamped opposed portions having outwardly flared tips 68 that facilitate the relatively straight portions 70 and 72 of the latch bars to pass between the same to a position between the spaced portions of the ears 62 and 64.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. A tire chain clip comprising a pair of circumferential chains placeable on opposite sides of a tire, longitudinally spaced cross chains carried by said circumferential chains, an arcuate member embracing the periphery of a tire, means for anchoring one end of each of said circumferential chains to said member, a pivotal latch carried by said member for lockably engaging a selected link adjacent the free extremity of said circumferential chains, and means carried by said arcuate member for holding said latch in a locked position, said last mentioned means including a pair of resilient jaws carried by said member for yieldingly retaining said latch in a locked position.

2. A tire chain clip comprising a substantially U-shaped resilient member, bearing plates integrally formed with the leg portions of said member, a pair of circumferential chains having one of their ends anchored to said bearing plates, an ear fixed to each of said bearing plates, a pair of latch bars having bifurcated end portions pivotally engaging said ears, the furcations of said latch bars terminating in hooks for engaging selected links of said chains, and a pair of normally engaged resilient jaws carried by each of said bearing plates for engaging said latch bars to hold the same in a locked position.

3. The combination of claim 2 wherein said ears include arcuate bearing edges conforming to the shape of said terminal hooks.

CHARLES F. KAPP.

REFERENCES CITED

The following references are of record in the file of this patent:

UNITED STATES PATENTS

| Number | Name | Date |
|---|---|---|
| 1,266,507 | Ludwig | May 14, 1918 |
| 1,758,944 | Grosch | May 20, 1930 |
| 1,864,869 | Squier | June 28, 1932 |

FOREIGN PATENTS

| Number | Country | Date |
|---|---|---|
| 105,863 | Sweden | Nov. 3, 1942 |